United States Patent
Wu et al.

(10) Patent No.: US 9,069,427 B2
(45) Date of Patent: Jun. 30, 2015

(54) HIGH NOISE IMMUNITY SENSING METHODS AND APPARATUS FOR A CAPACITIVE TOUCH DEVICE

(71) Applicant: Elan Microelectronics Corporation, Hsinchu (TW)

(72) Inventors: Chia-Mu Wu, Hsinchu (TW); Yi-Chia Hsu, Hengshan Township, Hsinchu County (TW); Jung-Shou Huang, Da-an Shiang (TW)

(73) Assignee: ELAN MICROELECTRONICS CORPORATION, Hsinchu (TW)

( * ) Notice: Subject to any disclaimer, the term of this patent is extended or adjusted under 35 U.S.C. 154(b) by 147 days.

(21) Appl. No.: 13/795,844

(22) Filed: Mar. 12, 2013

(65) Prior Publication Data

US 2013/0257797 A1    Oct. 3, 2013

(30) Foreign Application Priority Data

Apr. 3, 2012    (TW) .............................. 101111899 A

(51) Int. Cl.
   *G06F 3/044*    (2006.01)
   *G06F 3/041*    (2006.01)

(52) U.S. Cl.
   CPC .............. *G06F 3/044* (2013.01); *G06F 3/0416* (2013.01)

(58) Field of Classification Search
   CPC .............................. G06F 3/0416; G06F 3/044
   USPC .................................................. 345/173–174
   See application file for complete search history.

(56) References Cited

U.S. PATENT DOCUMENTS

| | | | |
|---|---|---|---|
| 4,742,557 A * | 5/1988 | Ma .................................. | 382/172 |
| 2011/0157068 A1 * | 6/2011 | Parker et al. .................. | 345/174 |
| 2012/0075228 A1 | 3/2012 | Chang et al. | |
| 2012/0075245 A1 | 3/2012 | Chang et al. | |
| 2012/0113047 A1 * | 5/2012 | Hanauer et al. ............... | 345/174 |
| 2014/0022213 A1 | 1/2014 | Chang et al. | |

* cited by examiner

*Primary Examiner* — Charles V Hicks
*Assistant Examiner* — Charles Zheng
(74) *Attorney, Agent, or Firm* — patenttm.us

(57) ABSTRACT

A sensing method and a sensing apparatus for a capacitive touch device sense variations of self capacitances of first traces in a first direction and second traces in a second direction and variations of mutual capacitances of intersections between the first traces and the second traces, and then generates fourth sensed values from the first, second and third sensed values to serve as sensed values of the changes of the mutual capacitances of the intersections between the first traces and the second traces for identifying one or more touch points. Therefore, noise interference is suppressed and real touch points can be easily to be identified.

4 Claims, 3 Drawing Sheets

HIGH NOISE IMMUNITY SENSING METHODS AND APPARATUS FOR A CAPACITIVE TOUCH DEVICE

FIELD OF THE INVENTION

The present invention is related generally to a capacitive touch device and, more particularly, to a sensing method and apparatus for a capacitive touch device.

BACKGROUND OF THE INVENTION

A capacitive touch device detects a touch point by sensing the capacitance variation of a capacitive touch sensor. For example, referring to FIG. 1, a two-dimensional capacitive touch sensor 10 has traces $X_1$-$X_9$ in the X direction and traces $Y_1$-$Y_8$ in the Y direction, where the traces $X_1$-$X_9$ and $Y_1$-$Y_8$ are not electrically connected to each other, in which arrangement each of the traces $X_1$-$X_9$ and $Y_1$-$Y_8$ has a self capacitance, and each intersection of the traces $X_1$-$X_9$ and $Y_1$-$Y_8$ has a mutual capacitance between the two traces involving the intersection. When a finger 12 touches the two-dimensional touch sensor 10, the self capacitances and the mutual capacitance sensed from the traces of the touch point have capacitance variations. The sensing schemes for capacitive touch devices are conventionally classified into all point scan and projection scan. Sensing methods based on all point scan sense the variations of the mutual capacitances at all trace intersections during a sensing period of a frame, while sensing methods based on projection scan sense the variations of the self capacitances of all traces $X_1$-$X_9$ and $Y_1$-$Y_8$ during a sensing period of a frame and then generate the intersecting points by projection from the X and Y directions. In sensing the variation of a self capacitance, taking the trace $Y_7$ as an example, an excitation signal Tx is applied to the trace $Y_7$, and a sensed signal Rx is received from the same trace $Y_7$. The sensed value generated from the sensed signal Rx is processed, for example, compared to a base self capacitance or a threshold, to extract the variation of the self capacitance of the trace $Y_7$. When a finger 12 touches the trace $Y_7$, the capacitance of the finger 12 to the ground plane is parallel connected to the self capacitance of the trace $Y_7$, and thus the sensed value from the trace $Y_7$ is different from that obtained when the trace $Y_7$ is not touched, from which it can identify whether the trace $Y_7$ is touched. In sensing the variation of a mutual capacitance, taking the traces $X_8$ and $Y_7$ for example, an excitation signal Tx is applied to the trace $Y_7$ (or $X_8$), and a sensed signal Rx is received from the corresponding trace $X_8$ (or $Y_7$). The sensed value generated from the sensed signal Rx is processed, for example, compared to a base mutual capacitance or a threshold, to extract the variation of the mutual capacitance between the traces $X_8$ and $Y_7$. When a finger 12 touches the intersection of the traces $X_8$ and $Y_7$, the capacitance of the finger 12 to the ground plane reduces the sensed mutual capacitance, by which it can identify the intersection of the traces $X_8$ and $Y_7$ is touched.

When sensing a capacitive touch sensor, noise interference can bring errors to the sensed value, causing a point that is not touched to be mistaken as a touch point, or causing the reported coordinates inaccurate, which in turn leads to misoperation. For example, referring to FIG. 1, when a finger 12 touches a point between the traces $X_7$, $X_8$ and $Y_7$, $Y_8$, the coordinates of the touch point can be calculated from either the variations of the mutual capacitances between the traces $X_7$ and $X_8$ and between the traces $Y_7$ and $Y_8$ or the variations of the self capacitances of the trace $X_7$, $X_8$, $Y_7$ and $Y_8$. However, if the sensed value is error due to noise interference, the calculated coordinates will be deviated from the actual position of the finger 12. If, due to noise interference, the sensed value of the variation of the mutual capacitance between the traces $X_3$ and $Y_7$ or the sensed values of the variations of the self capacitances of the traces $X_3$ and $Y_7$ exceeds the threshold that is set by the sensing circuit, the sensing circuit will identify the intersection 14 of the traces $X_3$ and $Y_7$ as another touch point. For eliminating mistakes caused by noise interference, an approach is to use a median filter for filtering signals, yet this can reduce the sensitivity. Another approach is to raise a threshold of the algorithm, but this can make the capacitive touch sensor less supportive to hardware. Yet another approach is to further check the sensed values of a frame each time the scan for the frame is completed, and if the sensing for the frame is identified that the noise interference level exceeds the preset value, discard the sensed values of the frame and sense for the frame again until acceptable sensed values are obtained. However, this approach is passive and lowers the frame rate that will slower the response of the capacitive touch device and cause users operate not smoothly.

Conventional solutions all compromise other parameters, and therefore it is desired a sensing method and apparatus for suppressing noise interference without compromising other parameters.

SUMMARY OF THE INVENTION

The present invention is directed to a high noise immunity sensing methods and apparatus for a capacitive touch device. Specifically, it is provided a sensing method and apparatus for actively suppressing noise interference in a capacitive touch device.

According to the present invention, a high noise immunity sensing method for a capacitive touch device senses variations of self capacitances of first traces in a first direction and second traces in a second direction and variations of mutual capacitances of intersections between the first traces and the second traces, and generates fourth sensed values from the first, second and third sensed values to serve as sensed values of the changes of the mutual capacitances of the intersections between the first traces and the second traces for identifying one or more touch points.

According to the present invention, a high noise immunity sensing apparatus for a capacitive touch device includes an excitation unit, a sampling unit, a processing unit and a control unit. The control unit controls the excitation unit and the sampling unit to sense self capacitances of first traces in a first direction and generate first sensed values representative of changes of the self capacitances of the first traces, to sense self capacitances of second traces in a second direction and generate second sensed values representative of changes of the self capacitances of the second traces, to sense mutual capacitances of intersections between the first traces and the second traces and generate third sensed values representative of changes of the mutual capacitances of the intersections between the first traces and the second traces, and controlling the processing unit to generate fourth sensed values from the first, second and third sensed values to serve as sensed values of the changes of the mutual capacitances of the intersections between the first traces and the second traces for identifying one or more touch points.

BRIEF DESCRIPTION OF THE DRAWINGS

These and other objectives, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

The self capacitance and the mutual capacitance of a capacitive touch sensor have different characteristics. The self capacitance varies more significantly in response to a touch, and thus has a higher signal to noise ratio (SNR), yet has a ghost problem in multi-touch applications. While multi-touch applications can be realized directly by sensing the mutual capacitance, the mutual capacitance has a smaller variation in response to a touch, and is thus easier to be affected by noise interference. The present invention provides a sensing method and a sensing apparatus that combine sensing of the self capacitance and the mutual capacitance to suppress noise interference. The sensing method and the sensing apparatus according to the present invention thus have the advantages of both the self capacitance based sensing scheme and the mutual capacitance based sensing scheme, achieving a high SNR and multi-touch applications.

Figure 1:
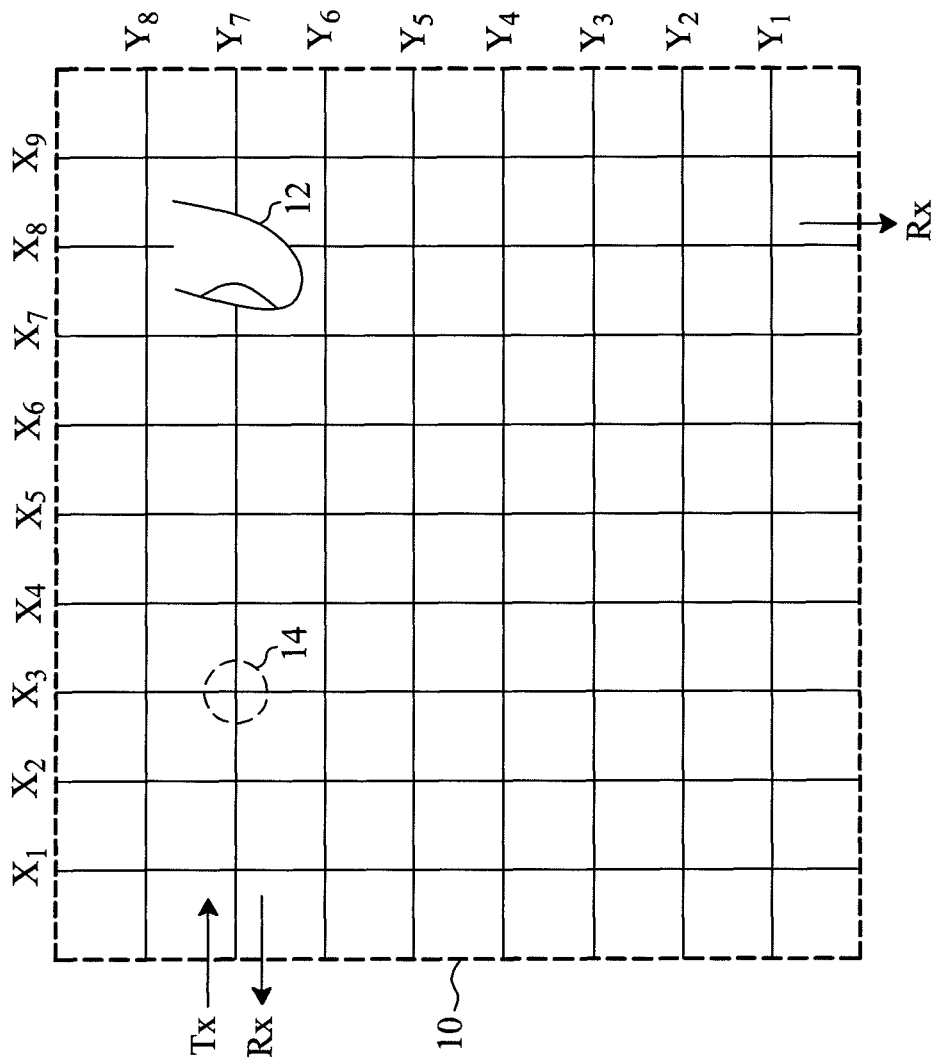
FIG. 1 is a schematic diagram showing a two-dimensional capacitive touch sensor and sensing of a self capacitance and a mutual capacitance from the capacitive touch sensor.
Figure 2:
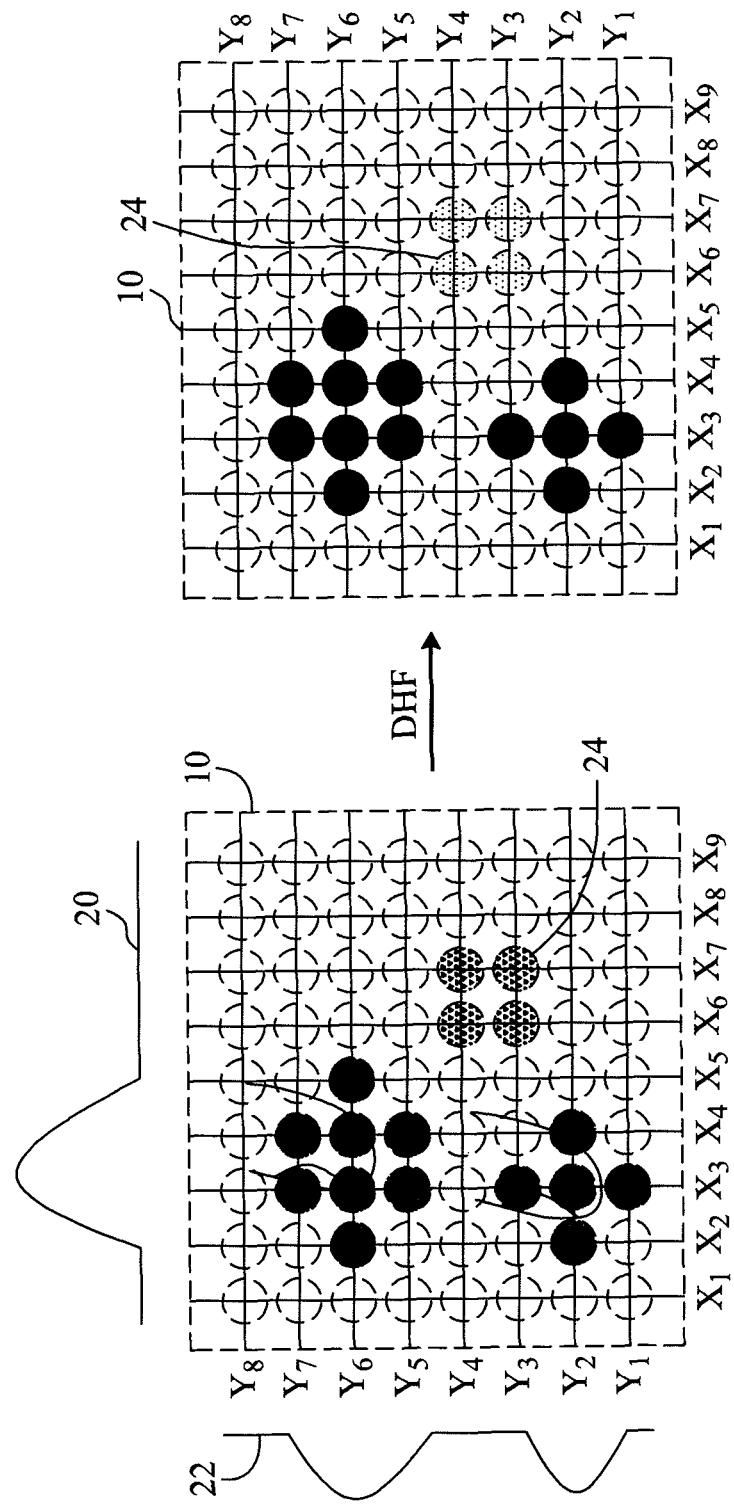
FIG. 2 is a schematic diagram showing an embodiment of a sensing method according to the present invention.

FIG. 2 is a schematic diagram showing an embodiment of a sensing method according to the present invention, which includes, when sensing a capacitive touch sensor 10, sensing both the self capacitances of traces $X_1$-$X_9$ in X direction and traces $Y_1$-$Y_8$ in Y direction, and the mutual capacitances of intersections between the traces $X_1$-$X_9$ and $Y_1$-$Y_8$, to further generate first sensed values representative of changes of the self capacitances of the traces $X_1$-$X_9$ as shown by a waveform 20, second sensed values representative of changes of the self capacitances of the traces $Y_1$-$Y_8$ as shown by a waveform 22, and third sensed values representative of changes of the mutual capacitances at all the intersections between the traces $X_1$-$X_9$ and the traces $Y_1$-$Y_8$ as shown in the left part of FIG. 2, in which the different patterns shown on the intersections represent different levels of the variation of the mutual capacitances, where the denser the points in the pattern are, the greater the variation is. The variations of the mutual capacitances indicate that two fingers simultaneously touch the capacitive touch sensor 10. For illustration, it is assumed that noise interferes the sensing of the mutual capacitances and thus causes fake touch points 24; however, the noise interference would not be reflected in the waveforms 20 and 22 since the sensing of self capacitances has a higher SNR. The sensing method according to the present invention further performs digital hybrid filtering (DHF), which uses the above identified first, second and third sensed values for calculation to generate fourth sensed values as sensed values of the changes of the mutual capacitances at all the intersections between the traces $X_1$-$X_9$ and the traces $Y_1$-$Y_8$ as shown in the right part of FIG. 2, thereby using the advantage of high SNR provided by the sensing of the self capacitances to calibrate the mutual capacitances of the intersections, and in turn improving the overall SNR. As is shown in the right part of FIG. 2, the intersections touched by the two fingers are remained at the peaks of the variations of the mutual capacitances, while the calculated sensed values of the changes of the mutual capacitances at the fake touch points 24 become relatively nonobvious, thereby allowing a post-end circuit easily to distinguish the real touch points from the fake touch points 24.

Figure 3:
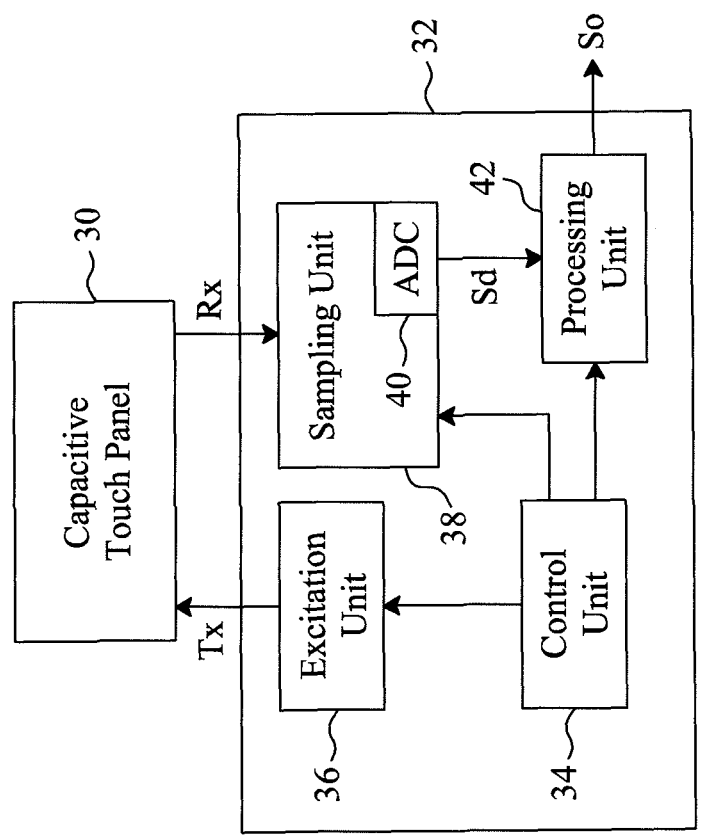
FIG. 3 is a schematic diagram showing an embodiment of a sensing apparatus according to the present invention.

FIG. 3 is a schematic diagram showing an embodiment of a sensing apparatus according to the present invention. A capacitive touch panel 30 has a capacitive touch sensor (not shown) connected to a sensing apparatus 32 that includes a control unit 34 to control an excitation unit 36 to apply an excitation signal Tx to the capacitive touch sensor, a sampling unit 38 to sample a sensed signal Rx received from the capacitive touch sensor, an analog-to-digital converter (ADC) 40 to convert the samples into sensed values Sd, and a processing unit 42 to perform calculation to generate an output signal So.

There are many ways to realize DHF calculation. For simplicity, it is assumed that the sensed values obtained from the variations of the self capacitances of the traces $X_3$ and $X_7$ are $Sxdv_3$ and $Sxdv_7$, respectively, the sensed values obtained from the variations of the self capacitances of the traces $Y_2$ and $Y_3$ are $Sydv_2$ and $Sydv_3$, respectively, and the sensed values obtained from the variations of the mutual capacitances between the traces $X_3$ and $Y_2$ and between the traces $X_7$ and $Y_3$ are $Mdv_{3,2}$ and $Mdv_{7,3}$, respectively. In one embodiment, the sensed values of the variations of the self capacitances and of the mutual capacitances are multiplied, and the products $Sxdv_3 \times Sydv2 \times Mdv_{3,2}$ and $Sxdv_7 \times Sydv_3 \times Mdv_{7,3}$ are taken as the sensed values of the variations of the mutual capacitances at the intersections between the traces $X_3$ and $Y_2$ and between the traces $X_7$ and $Y_3$, respectively. Since the variations $Sxdv_3$ and $Sydv_2$ of the self capacitances and the variation $Mdv_{3,2}$ of the mutual capacitance are relatively great due to the finger touch, the product $Sxdv_3 \times Sydv_2 \times Mdv_{3,2}$ for the intersection between the traces $X_3$ and $Y_2$ is increased by several times. For the fake touch points 24, although the variation $Mdv_{7,3}$ of the mutual capacitance is increased by noise interference, the variations $Sxdv_7$ and $Sydv_3$ of the self capacitances are relatively small due to the high SNR, so the product $Sxdv_7 \times Sydv_3 \times Mdv_{7,3}$ for the intersection between the traces $X_7$ and $Y_3$ is much smaller than the product $Sxdv_3 \times Sydv_2 \times Mdv_{3,2}$ for the intersection between the traces $X_3$ and $Y_2$. In this manner, the sensed values of real and fake touch points can be clearly differentiated, thereby suppressing noise interference.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A high noise immunity sensing method for a capacitive touch device having a plurality of first traces in a first direction and a plurality of second traces in a second direction, the sensing method comprising:

A.) sensing self capacitances of the plurality of first traces to further generate first sensed values representative of changes of the self capacitances of the plurality of first traces;

B.) sensing self capacitances of the plurality of second traces to further generate second sensed values representative of changes of the self capacitances of the plurality of second traces;

C.) sensing mutual capacitances of intersections between the plurality of first traces and the plurality of second traces to further generate third sensed values representative of changes of the mutual capacitances of the intersections between the plurality of first traces and the plurality of second traces; and D.) generating fourth sensed values from the first, second and third sensed values to serve as sensed values of the changes of the mutual capacitances of the intersections between the plurality of first traces and the plurality of second traces for identifying one or more touch points.

2. The high noise immunity sensing method of claim 1, wherein the step D comprises performing a multiplication of the first, second and third sensed values to generate the fourth sensed values.

3. A high noise immunity sensing apparatus for a capacitive touch device having a plurality of first traces in a first direction and a plurality of second traces in a second direction, the sensing apparatus comprising:

an excitation unit connected to the plurality of first traces and the plurality of second traces;

a sampling unit connected to the plurality of first traces and the plurality of second traces;

a processing unit connected to the sampling unit; and a control unit connected to the excitation unit, the sampling unit and the processing unit, controlling the excitation unit and the sampling unit to sense self capacitances of the plurality of first traces and generate first sensed values representative of changes of the self capacitances of the plurality of first traces, to sense self capacitances of the plurality of second traces and generate second sensed values representative of changes of the self capacitances of the plurality of second traces, to sense mutual capacitances of intersections between the plurality of first traces and the plurality of second traces and generate third sensed values representative of changes of the mutual capacitances of the intersections between the plurality of first traces and the plurality of second traces, and controlling the processing unit to generate fourth sensed values from the first, second and third sensed values to serve as sensed values of the changes of the mutual capacitances of the intersections between the plurality of first traces and the plurality of second traces for identifying one or more touch points.

4. The high noise immunity sensing apparatus of claim 3, wherein the control unit controls the processing unit to perform a multiplication of the first, second and third sensed values to generate the fourth sensed values.

* * * * *